Figure 1:
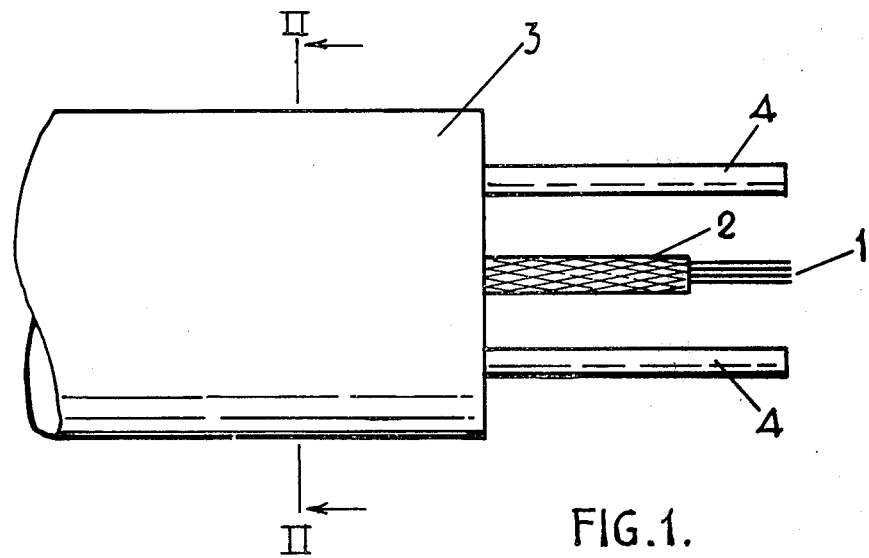

United States Patent [19]

Lewis

[11] 4,172,106
[45] Oct. 23, 1979

[54] OPTICAL FIBRE CABLES AND THEIR MANUFACTURE

[75] Inventor: Dennis L. Lewis, Watford, England

[73] Assignee: Telephone Cables Limited, Essex, England

[21] Appl. No.: 803,423

[22] Filed: Jun. 6, 1977

[30] Foreign Application Priority Data

Jun. 24, 1976 [GB] United Kingdom ............... 26357/76
Oct. 13, 1976 [GB] United Kingdom ............... 42530/76

[51] Int. Cl.² .............................................. B29D 11/00
[52] U.S. Cl. ....................................... 264/1; 264/209; 350/96.23; 350/320; 425/381
[58] Field of Search ................... 350/96.23; 174/70 R; 425/378 R, 381, 381.2; 264/1, 99, 209, DIG. 41, 174

[56] References Cited

U.S. PATENT DOCUMENTS

| 4,022,603 | 5/1977 | Roeder et al. ............... 426/381 X |
| 4,100,008 | 7/1978 | Claypoole .................... 350/96.23 X |

FOREIGN PATENT DOCUMENTS

| 2505621 | 8/1975 | Fed. Rep. of Germany ........ 350/96.23 |
| 2528991 | 2/1976 | Fed. Rep. of Germany ........ 350/96.23 |
| 2530242 | 2/1976 | Fed. Rep. of Germany ........ 350/96.23 |
| 2600100 | 7/1976 | Fed. Rep. of Germany ........ 350/96.23 |
| 2513723 | 10/1976 | Fed. Rep. of Germany ........ 350/96.23 |
| 2296192 | 7/1976 | France .................................. 350/96.23 |
| 1438074 | 6/1976 | United Kingdom ................ 350/96.23 |

OTHER PUBLICATIONS

Corning Glass Works, "Optic Cable", Optics and Laser Technology, vol. 7, No. 4, Aug. 1975, p. 150.

Primary Examiner—John K. Corbin
Assistant Examiner—John D. Lee
Attorney, Agent, or Firm—Kirschstein, Kirschstein, Ottinger & Cobrin

[57] ABSTRACT

In an optical fibre cable having a core of one or more straight optical fibre waveguides, with or without a textile sleeve, the protective sheath surrounding the core consists of a plastic tube incorporating reinforcing tensile material in its wall, the relative proximity of the fibres, the sleeve if present, and the sheath being such as to permit freedom of movement of the fibres in relation to the sheath, in both radial and axial directions. The preferred form of reinforcement consists of elongate tensile members, such as steel wires, embedded in the sheath wall, equally spaced apart and lying parallel to the core. The reinforced sheath is formed by a single continuous extrusion step, the reinforcing members being fed into the extruded plastic material simultaneously with the feeding of the cable core into the bore of the extruded sheath. Preferably the optical fibres, especially if unsleeved, are introduced into the sheath bore through a stationary inner tube inserted through and beyond the central duct of the extruder head, to prevent adhesion of the fibres to the soft extrudate.

6 Claims, 5 Drawing Figures

OPTICAL FIBRE CABLES AND THEIR MANUFACTURE

This invention relates to optical fibre cables, that is to say cables of the type comprising a core consisting of one or more optical fibre waveguides along which communications signals can be transmitted in the form of visible light or infra-red or ultra violet radiation, and a protective sheath surrounding the core; the invention also relates to the manufacture of such cables.

It has been proposed to provide an optical fibre cable core with a double sheath, consisting of an inner reinforcing tube of material capable of withstanding tensile and bending strains (hereinafter referred to as "tensile material"), and an outer tube of flexible, thermoplastic material.

It is an object of the present invention to provide an improved form of optical fibre cable wherein the core is surrounded by a reinforced sheath, and it is a further object of the invention to provide an improved method of manufacturing a cable of the form described.

According to the invention, in an optical fibre cable consisting of a core composed essentially of one or more straight optical fibre waveguides lying parallel to the longitudinal axis of the cable, and a protective sheath surrounding the core, the said sheath consists of a single tube of synthetic plastic material incorporating reinforcing tensile material in at least part of its radial thickness.

The cable is preferably of circular cross-section, with the core disposed substantially along the longitudinal axis thereof. If desired, the optical fibre or fibres may be contained within a sleeve formed of braided or woven textile material, composed of either natural or synthetic fibres, this sleeve thus being included in the structure of the cable core. The proximity of such a sleeve to the fibre or fibres and/or to the cable sheath is preferably such as to permit freedom of movement, in both radial and axial directions, of each individual fibre in relation to the sleeve and/or of the sleeve in relation to the sheath. However, we have found that some advantages are gained by omitting the sleeve, the fibre or fibres of the cable core being covered only by a reinforced plastic sheath of sufficiently wide bore to permit the aforesaid freedom of movement of each fibre within it. Such freedom of movement of the fibres assists in maintaining the optical losses of the fibres, in operation of the cable, at a low value.

A preferred form of reinforcement for use in the cable sheath consists of a plurality of elongate tensile members embedded in and gripped by the sheath and disposed around and parallel to the optical fibre or fibres, said members preferably being substantially equally spaced apart and substantially equidistant from the cable core. These tensile members are required to have high tensile strength, such that they can withstand tensile and bending strains to which the cable is subjected in use, and to have thermal expansion characteristics such that no intolerable strains are imposed on the optical fibres, due to the presence of said members, under the influence of changes in temperature. The tensile members may consist of metal, for example steel, wires, or may be formed of glass or synthetic plastic material of suitable properties.

In the manufacture of an optical fibre cable in accordance with the invention, a tubular sheath of synthetic plastic material, incorporating said reinforcing material in at least part of its radial thickness, is formed around the cable core by a single continuous extrusion step. The extrusion is suitably carried out in an extruder head of the point and die type, the cable core being fed through a central duct in the point component while the heat softened sheath material is extruded from an annular channel between the point and die components, the reinforcing material being introduced into the sheath material before the latter emerges from the extruder head. When the sheath reinforcement consists of elongate tensile members, the extruder die-head is so designed that the tensile members, in the desired number and arrangement, are fed into and embedded in the plastic sheath material as it is extruded around the cable core. If a particulate tensile material is employed for the reinforcement of the sheath, such material is mixed with the plastic sheath material before the latter is extruded. The cable assembly consisting of the core and extruded reinforced sheath is pulled continuously from the outlet of the extruder die-head.

In a preferred method of manufacturing the optical fibre cable of the invention, which method is especially advantageous when the cable core consists of an unsleeved bundle of optical fibres, before the cable core is introduced into the central duct in the point component of the extruder head an inner tube, the bore of which is of suitable cross-section for accommodating said core with a loose or sliding fit, is inserted through said duct so as to lie within the whole length of the duct and to extend beyond the point of the extruder die-head to a position at which the extruded sheath will have cooled sufficiently to prevent adhesion of the core thereto, then the core is pushed through the said inner tube so as to project beyond the end thereof and enter the bore of the extruded sheath at said position, and the moving sheath is caused to grip the end of the core at a point beyond said position in the path of travel of the sheath from the extruder head, to enable the whole length of the core to be pulled from the extruder head together with the sheath.

The said inner tube is suitably formed, for example, of polytetrafluoroethylene or stainless steel. The use of the inner tube for initially supporting an unsleeved fibre bundle core is advantageous in that it prevents the fibres from coming into contact with the extruded sheath until the latter has cooled to such an extent that the fibres will not adhere thereto.

Gripping of the fibre ends by the sheath can be achieved during the winding of the sheath-core assembly on to a drum, or preferably by pinching the sheath on to the fibre ends shortly after the latter emerge from the inner tube. The pinched portion of the sheath is subsequently cut off, together with any initial portion of the sheath which has been pulled before the insertion of the fibres.

Figure 2:
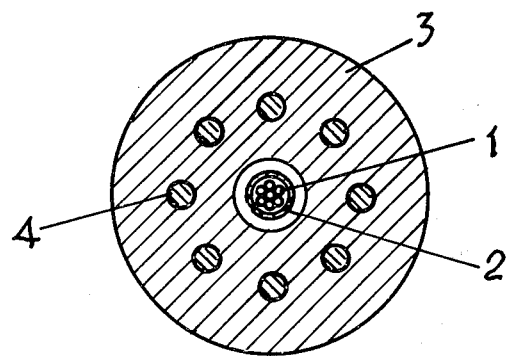
Figure 3:
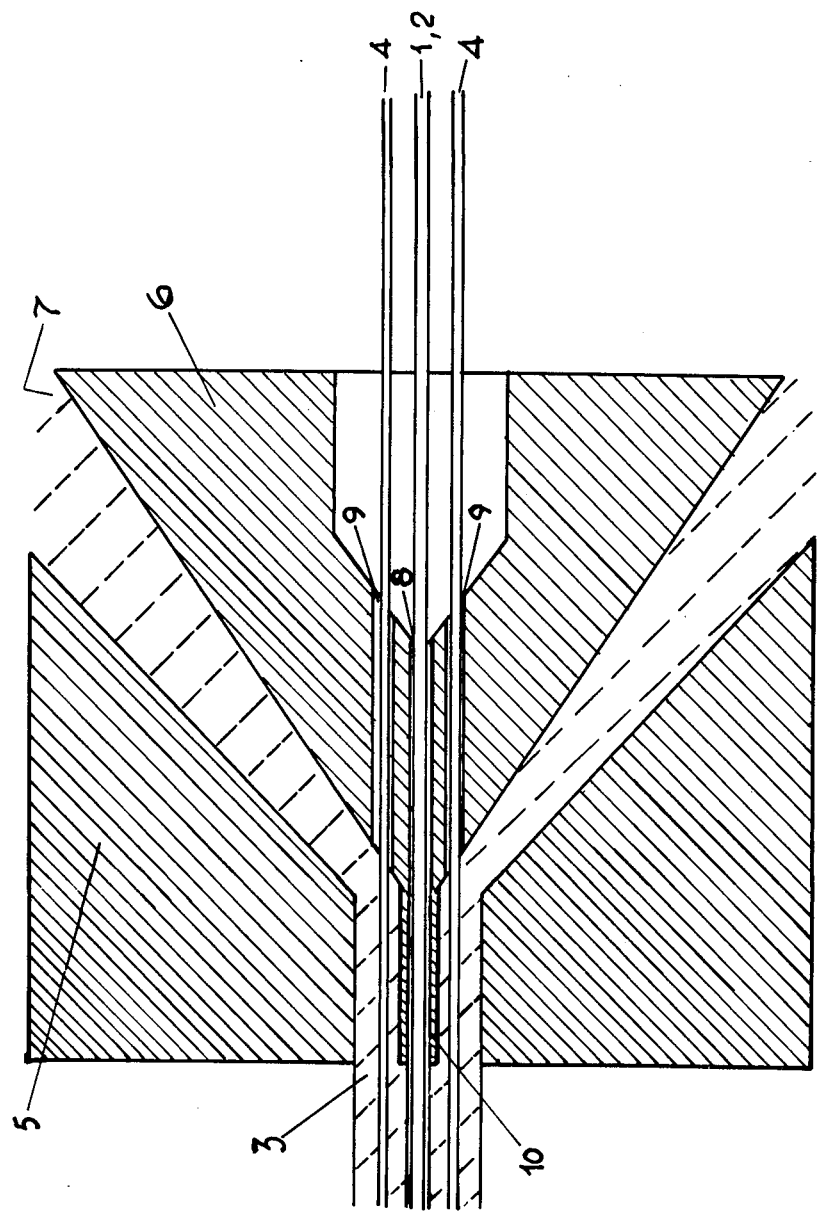
Figure 4:
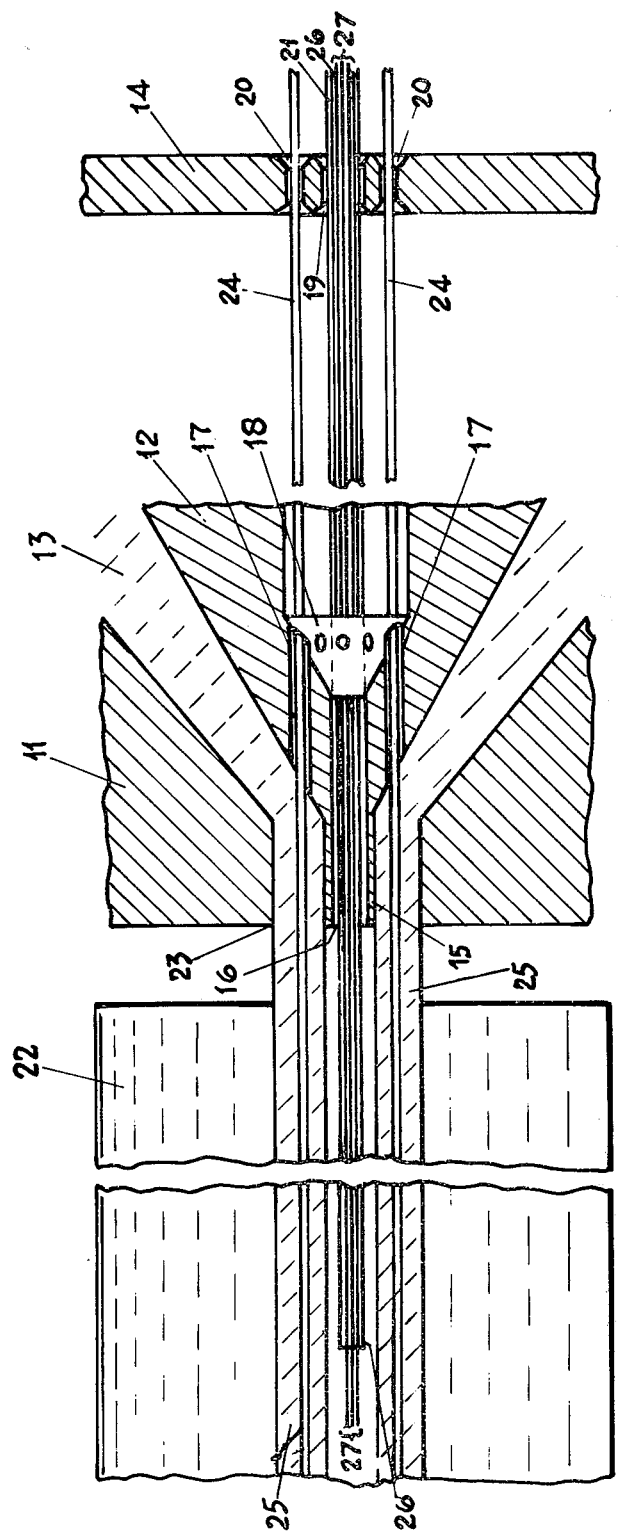
Figure 5:
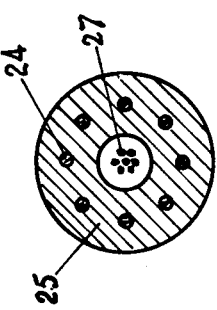

Some specific forms of optical fibre cable in accordance with the invention, and methods of manufacturing the cables, will now be described by way of example, with reference to the accompanying diagrammatic drawings, in which FIG. 1 shows, in elevation, one form of cable having a sleeved optical fibre bundle core, FIG. 2 shows a cross-section of the said cable, drawn on the line II—II in FIG. 1, FIG. 3 shows, in sectional elevation, part of an extruder die-head which can be employed for forming the reinforced plastic sheath in the manufacture of a cable of the form shown in FIGS. 1 and 2, FIG. 4 shows, in part-sectional elevation, apparatus including parts of an extruder die-head, employed for a preferred method of manufacturing a second form of cable according to the invention, having a core consisting of an unsleeved bundle of optical fibres, the components of the cable being shown at an early stage of the extrusion process, and FIG. 5 is a cross-section of a cable produced by the method described with reference to FIG. 4.

Like parts shown in different figures of the drawings are indicated by the same reference numerals.

The core of the cable shown in FIGS. 1 and 2 consists of a bundle of seven straight parallel optical fibre waveguides, 1, encased in a loosely fitting braided cotton sleeve 2. The optical fibres may be of either the single mode or multimode type, of any desired composition and structure, and preferably each fibre has a protective coating of a synthetic resin incorporating a filler material having a high modulus of elasticity. The core lies loosely in the bore of a polyethylene sheath 3, which is reinforced by eight stainless steel wires 4 lying parallel to the core and arranged in a circle substantially in the centre of the radial thickness of the sheath. In FIG. 1 only two of the wires are shown, for simplicity, and parts of the sleeve 2 and sheath 3 have been cut away in order to show, respectively, the optical fibres and the core and wires.

In a specific example of a cable of the form shown in FIGS. 1 and 2, the optical fibres are each composed of a doped silica core and silica cladding, the dopant suitably being phosphorus pentoxide, distributed so as to impart to the fibres either a step refractive index profile or a graded refractive index profile, as desired. Each fibre may be 120 microns in diameter, and has a multilayer protective coating of polyurethane resin, suitably consisting of a first, innermost layer of the resin loaded with 10% to 15% by weight of lampblack, and three outer layers of the resin loaded with 10% to 15% by weight of titania together with a different coloured dye for each layer; the total diameter of each coated fibre may be approximately 150 microns, giving a seven-fibre bundle of diameter approximately 0.5 mm. The diameter of the sleeve 2 is approximately 1.0 mm, the radial thickness of the polyethylene sheath 3 is 3 mm, and the wires 4 are each of 0.5 mm diameter. The number of wires employed in a cable of these dimensions may be varied between 4 and 12, and the wires may be of diameter in the range of 0.5 to 1.0 mm.

In the manufacture of a cable of the form shown in FIGS. 1 and 2, the seven resin-coated optical fibres are unwound from separate drums and brought together to form a parallel bundle, and the bundle is passed through a braiding machine in which the braided cotton sleeve is formed around it, in known manner. The wire-reinforced polyethylene sheath is then formed around the sleeved fibre bundle by means of an extruder having a die-head of the form shown in FIG. 3.

The extruder die-head comprises a die component 5 and conical point component 6, separated from one another by a tapering annular space 7; the point component 6 is formed with a central duct 8 through which the cable core can pass, and eight additional ducts 9, disposed in a circle around the central duct, which additional ducts are of suitable diameter for accommodating the reinforcing wires; the tip of the point component is also extended to form an elongated cylindrical nozzle 10. For sheathing the cable core 1, 2, the core and eight steel wires 4 are simultaneously fed through the ducts 8 and 9 respectively, while at the same time heat-softened polyethylene supplied to the annular space 7 is extruded around the assembly of core and wires as they emerge from the nozzle 10 of the point tip, so that the wires are embedded in the wall of the sheath formed around the cable core. The nozzle 10 prevents the hot extrudate from coming into contact with the core as the latter emerges from the point tip, and ensures that the sheath is formed with a bore of somewhat larger diameter than that of the core.

The extruder die-head shown in FIG. 4 includes a die component 11 and point component 12 separated from one another by an annular channel 13, the point component having an elongated nozzle 15, through which the central duct 16 extends, and a plurality of additional ducts 17 arranged at regular intervals in a circle around the central duct, and terminating in holes in a conical collar 18 located around the central duct. FIG. 4 also shows the back plate 14 of the extruder head, which has a central hole 19 and a plurality of smaller surrounding holes 20, respectively corresponding to and aligned with the central duct 16 and surrounding ducts 17 in the point component, and a stainless steel tube 21 extends backwards from the central duct 16, through the central hole 19 in the back plate. A cold water tank 22 is provided adjacent to the outlet 23 of the die-head, the water tank being of sufficient length to further cool the extruded sheath to room temperature in the time taken for the extrudate to travel through the tank.

In carrying out the sheath-forming process, using the apparatus shown in FIG. 4, steel wires 24 are fed continuously through the holes 20 in the back plate and the ducts 17 in the point component, while at the same time synthetic plastic material supplied to the channel 13 is extruded around the wires, the nozzle 15 controlling the bore diameter of the extruded sheath 25 in the same way as the nozzle 10 in FIG. 3. Shortly after commencment of the extrusion process a tube 26 of polytetrafluoroethylene is inserted through the tube 21 and central duct 16, the tube 21 being designed to facilitate the insertion of tube 26 into said duct. The tube 26 is of sufficient length to extend from some distance beyond the outer side of the back plate 14 (so that this end of the tube is readily accessible) to a position in the water tank at which the extruded sheath will have cooled sufficiently to prevent adhesion of optical fibres thereto. A bundle of optical fibres 27 is then introduced into the outer end of the tube 26 and pushed manually through this tube until the ends of the fibres have emerged from the end of the tube within the extruded sheath. When the fibre bundle protrudes sufficiently far from the said end of the tube 26, the moving sheath 25 is pinched on to the fibre ends, suitably manually by means of pliers, so that the sheath grips the fibre ends firmly and, as the sheath continues to travel, the fibres are pulled through the tube 26 which remains stationary. Thereafter the assembly of fibre bundle 27, wires 24 and sheath 25 is continuously pulled and wound on to a drum (the pulling means and drum are of conventional form and are not shown in the drawing).

In a specific example of the apparatus and procedure described above with reference to FIG. 4, the bore diameter of the die-head outlet 23 and the external diameter of the nozzle 15 are such that the sheath 25 produced has a radial thickness of 3 mm and a bore of 2 to 3 mm diameter; eight reinforcing wires 24, each of diameter 0.5 mm, are located approximately in the centre of the radial thickness of the sheath. The cable core consists of a bundle of seven optical fibre waveguides, which may be of the form described above for use in the cable shown in FIGS. 1 and 2.

The plastic material employed for forming the sheath 25 is polyethylene, which is extruded at a temperature of 190° C. to 200° C., and which is required to be cooled to approximately 100° C. before being brought into contact with the optical fibres, to ensure that adhesion between the fibres and the sheath is avoided. The cable is pulled from the extruder die-head at the rate of 10 meters per minute, and at this rate of travel a water tank 20 meters long is required for cooling the extruded sheath to room temperature; the temperature is reduced to 100° C. in approximately half a minute, in cold water: hence the inner polytetrafluoroethylene tube 26 is arranged to extend into the water tank for a distance of 5 meters, that is to say to the point at which the sheath temperature is reduced to 100° C. The tube 26 employed to accommodate the specific fibre bundle described above has an external diameter of 1.2 mm and an internal diameter of 0.75 mm; the tube may be coloured orange, in order to be visible through the translucent polyethylene sheath so that the position of the tube within the sheath can be correctly located.

The completed cable, manufactured in the manner described above with reference to FIG. 4, is shown in cross-section in FIG. 5, in which the components of the cable are indicated by the same reference numerals as those employed for the said components in FIG. 4.

I claim:

1. A method of manufacturing an optical fibre cable consisting of a core composed essentially of at least one straight optical fibre waveguide lying parallel to the longitudinal axis of the cable, and a protective sheath, surrounding the core, the said sheath consisting of a single tube of synthetic plastic material incorporating reinforcing tensile material in at least part of its radial thickness, and each optical fibre having freedom of movement in relation to the sheath, in both radial and axial directions, in which method a tubular sheath of synthetic plastic material, incorporating said reinforcing material in at least part of its radial thickness, is formed around the cable core in a single continuous extrusion step in an extruder die-head comprising a die component and a point component, the core being fed through a central duct in the point component while the heat-softened sheath material is extruded from an annular channel between the point and die components, said reinforcing material being introduced into the sheath material before the latter emerges from the extruder head, and the assembly of core and extruded reinforced sheath being pulled continuously from the outlet of the extruder head.

2. A method according to claim 1, wherein a plurality of elongate tensile members are fed through additional ducts provided in the point component of the extruder head and arranged around the central duct, so that the said tensile members are embedded in the plastic sheath material as the latter is extruded around the cable core.

3. A method according to claim 1, wherein the extruded sheath is formed with a bore of larger diameter than that of the cable core, by extruding the sheath material around an elongated cylindrical nozzle which extends from the tip of the point component of the extruder head and through which the said central duct extends.

4. A method according to claim 1, wherein before the cable core is introduced into said central duct an inner tube, of bore capable of accommodating the core, is inserted through said duct so as to lie within the whole length of the duct and to extend beyond the outlet of the extruder head to a position at which the extruded sheath will have cooled sufficiently to prevent adhesion of the core thereto, then the core is pushed through the said inner tube so as to project beyond the end thereof and enter the bore of the extruded sheath at said position, and the moving sheath is caused to grip the end of the core at a point beyond said position in the path of travel of the sheath from the extruder head, whereby the whole length of the core is pulled from the extruder head together with the sheath.

5. A method according to claim 1, which includes the steps of feeding a cable core, consisting of a plurality of optical fibres contained within a loosely-fitted braided cotton sleeve, through the said central duct of the point component of the extruder head and through an elongated cylindrical nozzle extending from the tip of said component, extruding heat-softened synthetic plastic material around said nozzle from the annular channel between the point and die components of the extruder head to form around said core a tubular sheath having a bore the diameter of which is controlled by the external diameter of said nozzle and is larger than the diameter of the core, feeding from 4 to 12 steel wires into the said plastic material in the said channel, through additional ducts formed in the point component and disposed in a circle around said central duct, and pulling the assembly of said core, sheath and wires from the outlet of said extruder head, all of the said steps being carried out simultaneously and continuously, and the said additional ducts in the point component being so located that the wires fed therethrough are embedded in the sheath substantially in the centre of the radial thickness thereof, and are substantially equally spaced apart and substantially equidistant from the cable core.

6. A method according to claim 1, which includes the steps of continuously extruding heat-softened synthetic plastic material from the annular channel between the point and die components of the extruder head and around an elongated cylindrical nozzle extending from the tip of the point component to form a tubular sheath having a bore the diameter of which is controlled by the external diameter of said nozzle and is larger than the diameter of the core, and simultaneously continuously feeding from 4 to 12 steel wires into the said plastic material in the said channel, through additional ducts formed in the point component and disposed in a circle around the central duct thereof, then after commencement of the said simultaneous extrusion and wire feeding steps inserting a polytetrafluoroethylene tube, of bore capable of accommodating the cable core, through the said central duct and nozzle via a tube extending from the central duct to the back plate of the extruder head, said polytetrafluorothylene tube being of such length that its rear end extends beyond the outer side of said back plate and its front end extends to a position beyond the outlet of the extruder head at which the extruded sheath will have cooled sufficiently to prevent adhesion of optical fibres thereto, then introducing a bundle of optical fibres into the rear end of the said polytetrafluoroethylene tube and pushing said bundle through said tube until the ends of the fibres emerge from the front end of said tube into the bore of the extruded sheath, then pinching the sheath on to, so as to grip, the fibre ends, the assembly of fibre bundle and extruded sheath with embedded wires then being pulled continuously from the extruder head outlet, the fibre bundle passing continuously through the stationary polytetrafluoroethylene tube.

* * * * *